United States Patent [19]

Stache et al.

[11] 3,872,081
[45] Mar. 18, 1975

[54] DIGITOXIGENIN RHAMNOSIDE CYCLOCARBONATES

[75] Inventors: Ulrich Stache; Werner Haede, both of Hofheim, Taunus; Werner Fritsch, Neuenhain, Taunus; Kurt Radscheit, Kelkheim, Taunus; Ernst Lindner, Frankfurt am Main, all of Germany

[73] Assignee: Hoechst Aktiengesellschaft, Frankfurt am Main, Germany

[22] Filed: June 18, 1973

[21] Appl. No.: 370,685

[30] Foreign Application Priority Data
June 20, 1972 Germany............................ 2230004

[52] U.S. Cl............................. 260/210.5, 424/182
[51] Int. Cl.......................................... C07c 173/02
[58] Field of Search.................. 260/210.5; 424/182

[56] References Cited
UNITED STATES PATENTS
| | | | |
|---|---|---|---|
| 3,223,587 | 12/1965 | Wilkinson........................ | 260/210.5 |
| 3,514,441 | 5/1970 | Scitoh............................. | 260/210.5 |
| 3,753,975 | 8/1973 | Kaiser et al..................... | 260/210.5 |

Primary Examiner—Johnnie R. Brown
Assistant Examiner—Cary B. Owens
Attorney, Agent, or Firm—Curtis, Morris & Safford

[57] ABSTRACT

Digitoxigenin-3-α-[L-rhamnopyranoside-2',3'-cyclocarbonates] of the general formula I

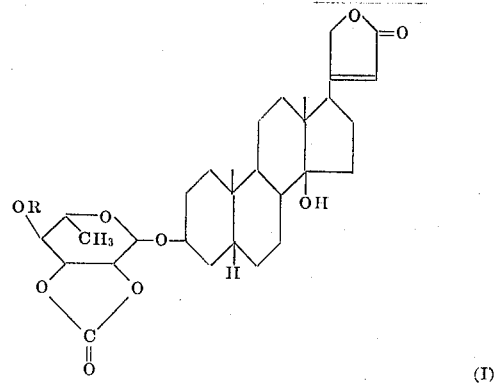

(I)

wherein R is hydrogen or alkanoyl or alkyl having 1 to 5 carbon atoms are described as well as two processes for their preparation. The compounds show positive inotropic action and are suitable for treating heart diseases.

5 Claims, No Drawings

DIGITOXIGENIN RHAMNOSIDE CYCLOCARBONATES

The present invention relates to digitoxigenin-3α-[L-rhamnoside-2',3'-cyclocarbonate] (=evomonoside-2',3'-cyclo-carbonate) and the 4'-alkyl or acyl derivatives thereof and to a process for preparing them.

The compounds according to the invention are those of the general formula I

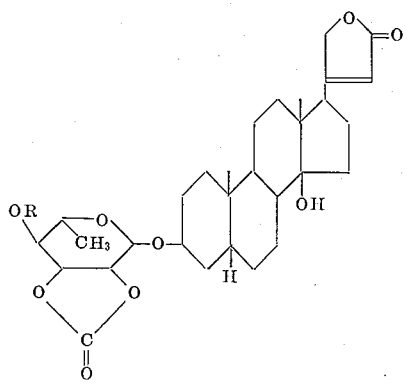

(I)

wherein R represents hydrogen or an alkanoyl or alkyl radical having 1 to 5 carbon atoms.

The compounds are prepared by a. reacting digitoxigenin-3-α-[L-rhamnoside] (=evomonoside) or an 4'-acyl- or alkyl derivative thereof corresponding to the general formula II

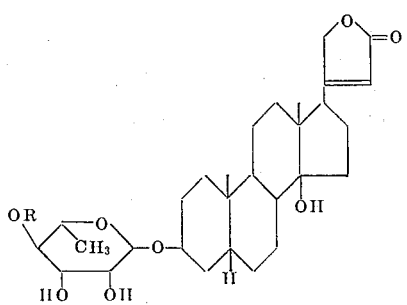

(II)

wherein R has the above meaning, with a functional activated derivative of carbonic acid, if desired in the presence of tertiary organic bases or b. treating the evomonoside-2',3'-cyclocarbonate of the general formula I, wherein R represents hydrogen, with an acylating or alkylating agent transferring the radical R representing alkanoyl or alkyl having 1 to 5 carbon atoms. To carry out process a) evomonoside or a 4'-acyl or 4'-alkyl derivative of evomonoside is preferably reacted with phosgene in an inert organic solvent in the presence of a tertiary organic base as a proton acceptor, whereby the vicinal cisoide hydroxyl groups in the L-rhamose portion of the evomonoside react with phosgene to yield the corresponding 2',3'-cyclo-carbonate. Phosgene is preferably used in excess. Insert solvents such as benzene, toluene or xylene are preferably used as organic solvents. As organic tertiary bases pyridine, diethyl aniline, quinoline or piperidine or triethyl amine are preferably used. The reaction is expediently carried out at a temperature between − 20°C and + 40°C; temperatures of below − 20°C or above + 40°C are also possible. After the reaction of the 2',3'-dihydroxy groups, the course of which can be controlled by thin layer chromatography, the mixture is worked up in usual manner by pouring it into water, extracting the resulting mixture with an organic solvent, evaporating the solvent and recrystallizing the product. The yield of the product is up to 90 percent of theory, the product being unitary upon thin layer chromatography.

The same products are obtained when reacting the vicinal cisoide hydroxy groups in 2',3'-position with a functional activated carbon acid derivative other than phosgene. The following compounds may be mentioned above all: N,N'-carbonyl diamide, N',N'-carbonyl diamidazole, N, N'-carbonyl di-triazolidine, carbonic acid dialkyl ester, carbonic acid diaryl ester or chloro-formic acid alkyl ester. The compounds preferably used are: N,N'-carbonyl diimidazole, dimethyl or diethylcarbonic acid ester, chloroformic acid methyl or ethyl ester.

During the reaction with phosgene or chloroformic acid esters the use of tertiary organic bases is indispensable for a smooth reaction, whereas the presence of these bases in the case of the other functional carbonic acid derivatives is not absolutely necessary. When using chloroformic acid esters in the presence of tertiary bases a subsequent treatment with alkali, preferably potassium bicarbonate in ketones such as acetone, is required.

To prepare the 4'-acyl- or 4'-alkyl derivatives of evomonoside-2',3'-cyclocarbonate according to b), evomonoside-2', 3'-cyclocarbonate of the formula I prepared according to a), wherein R represents hydrogen, is esterified or etherified according to usual methods. Suitable agents for esterification are above all carbonic acid halides or anhydrides, preferably acetyl chloride, propionyl chloride, buturyl chloride, valeric acid chloride, acetanhydride or propionic acid anhydride. Acylation is carried out in the presence of a tertiary organic base, such as pyridine, diethyl aniline; the presence of inert solvents such as for example dioxane, tetrahydrofurane, benzene or toluene can be suitable. To perform acylation the reaction mixture is preferably stirred for about 1 to 48 hours at a temperature of from 0°C to 100°C and then worked up in usual manner.

For alkylation the evomonoside-cyclocarbonate of the formula I (R = H) is refluxed while stirring, for example with an alkyl-halide, e.g., methyl iodide or ethyl bromide, in the presence of silver carbonate or silver oxide in an inert organic solvent, e.g., dichloroethane, methylene chloride, benzene or toluene, whereby anhydrous calcium sulfate can be used as a water acceptor, suitably in a Sohxlet apparatus. The mixture is worked up in usual manner.

The products of the invention exhibit valuable cardiotonic actions.

Thus, the products according to the invention show a positive inotropic action which corresponds to that of the starting materials described.

The compounds of the invention are especially advantageous with regard to their toxicity, which is considerably smaller than that of the starting materials. Thus, the therapeutic index of the product is improved considerably. Therefore, the products of the invention are particularly suitable for treating heart diseases, especially cardiac insufficiency, tachycardia and conduction defects. The products are preferably administered perorally in the form of tablets, dragees or capsules which contain, in addition to the active ingredient, a conventional pharmaceutical excipient and/or adjuvant, such as for example lactose, starch and other substances.

The compounds can also be administered parenterally, preferably by intravenous injection of suitably, an isotonic solution of a compound of the invention. As solvents can be used, for example, propylene glycol, water or physiological sodium chloride solution.

For the treatment of the heart diseases mentioned, the active ingredients are administered three to five times daily in a dosage of from 0.05 to 1.0 milligram.

The products of the invention can also be used as intermediates for the preparation of other cardio-active steroids.

The following Examples illustrate the invention.

EXAMPLE 1

Digitoxigenin-3-α-[4-rhamnopyranoside-2',3'-cyclocarbonate]

At 0°C a solution of 1.2 g of phosgene in 12 milliliters of absolute toluene was added dropwise, while stirring, within 30 minutes, to a solution of 1.04 g of digitoxigenin -3-α-[L-rhamnoside] (=evomonoside) in 50 milliliters of pyridine. Then the reaction solution was stirred for another hour and subsequently poured onto 300 ml of ice water. The whole was extracted with chloroform, the extracts were washed with aqueous 5 percent hydrochloric acid to pH 4; the mixture was washed with an aqueous sodium bicarbonate solution to pH 8 and subsequently with water until neutral. After drying over sodium sulfate, the solvent was evaporated under reduced pressure and the residue obtained was crystallized from diisopropyl ether. 1.12 g of crude evomonoside-2',3'-cyclocarbonate having a melting point of 191° to 192°C were obtained, which compound was chromatographed on silica gel "Merck", 0.05 - 0.2 mm (column: 3 × 15 cm). The compound was introduced as a solution in methylene chloride. Elution was carried out successively with 750 ml of benzene, 750 ml of methylene chloride and 1750 ml of methylene chloride/methanol = 99 : 1. After evaporating the last mentioned eluant and recrystallizing the residue from $CH_2Cl_2$/ether, 895 mg of evomonoside-2'-3'-cyclocarbonate were obtained having a melting point of from 180° to 182°C (Kofler heating bank).

Characteristic IR-bands (KBr): 3470, 1810, 1775, 1735, 1615, 1250, 1160, 1055, 1015, 995 $cm^{-1}$.

UV (methanol): λmax = 217 – 218 mμ (ε = 16300)

EXAMPLE 2:

Evomonoside-2',3'-cyclocarbonate-4'-acetate

A solution of 270 mg of evomonoside-2',3'-cyclocarbonate in 5 ml of pyridine and 5 ml of acetanhydride was stirred for one hour at 65°C. Then it was concentrated under reduced pressure the residue obtained was dissolved in a small amount of acetone, mixed with water and the acetone was distilled off. After repeating the operation the residue obtained was recrystallized from diethyl ether to yield 223 mg of evomonoside-2',3'-cyclocarbonate-4'-acetate having a melting point of 157° to 160°C.

Characteristic IR-bands (KBr): 3500, 1820, 1780, 1745, 1615, 1255, 1225, 1175, 1160, 1140, 1070, 1025, 1000, 990 $cm^{-1}$. UV (methanol): λmax = 217 – 218 mμ (ε = 16300).

EXAMPLE 3:

Evomonoside-2',3'-cyclocarbonate-4'-methyl ether

A solution of 200 mg of evomonoside-4'-methyl ether in 20 ml of pyridine was mixed within 30 minutes at 0°C while stirring with a solution of 240 mg of phosgene in 2.4 ml of toluene. Then the reaction mixture was poured onto 100 ml of ice water and worked up in the manner indicated in Example 1. 176 mg of evomonoside-2',3'-cyclocarbonate-4'-methyl ether were obtained which were recrystallized from methylene chloride/diisopropyl ether. Melting point: 161° – 165°C. UV (methynol): λmax = 217 – 215 mμ, ε = 15850.

In the IR spectrum (Kbr) at 3500 $cm^{-1}$ only the 14 β-hydroxyl group can be seen. For cyclocarbonate, characteristic bands are present at 1820 and 1250 $cm^{-1}$.

EXAMPLE 4:

Evomonoside-2',3'-cyclocarbonate

A solution of 1 g of evomonoside and 300 mg of N,N-carbonyldiimidazole in 10 milliliters of absolute tetrahydrofurane was refluxed for 90 minutes. The reaction mixture was introduced while stirring into 300 ml of water and extracted several times with methylene chloride. The extracts were washed with water, dried with sodium sulfate and the solvents were evaporated under reduced pressure. The residue obtained was chromatographed on silica gel as described in Example 1. After elution with 1750 milliliters of methylene chloride/methanol of 99 : 1 and after recrystallization from methylene chloride ether, 345 mg of evomonoside-2',3'-cyclocarbonate were obtained having the same characteristics as indicated in Example 1.

After further elution with methylene chloride/methanol 95 : 5, 420 mg of non-reacted evomonoside were obtained.

EXAMPLE 5:

Evomonoside-2',3'-cyclocarbonate-4'-propionate

At 0°C a solution of 180 mg of propionyl chloride in 2 milliliters of absolute dioxane was added dropwise to a solution of 290 mg of evomonoside-2',3'-cyclocarbonate in 2 milliliters of pyridine. After stirring for 16 hours at 25°C the reaction mixture was poured into 100 milliliters of water and allowed to stand for 24 hours. Subsequently the mixture was decanted from the oil precipitated; the oil was taken up by methylene chloride, washed with water, dried and distilled in vacuo. The residue obtained was recrystallized from diethyl ether to yield 227 mg of evomonoside-2',3'-cyclocarbonate-4'-propionate having a melting point of 108 to 112°C.

Characteristic IR-bands (KBr): 3500, 1825, 1780, 1745, 1615, 1260, 1225, 1180, 1160, 1140, 1075, 1025, 1000, 900 $cm^{-1}$. UV (methanol): λmax = 217 – 218 mμ; ε = 16 100.

In the same way, when using butyric acid and valeric acid chloride instead of propionic acid chloride, the corresponding 4'-butyrate or 4'-valeriate of the evomonoside-2',3'-cyclocarbonate were prepared.

We claim:
1. A digitoxigenine-3-α-[L-rhamnopyranoside-2',3'-cyclocarbonate] of the formula I

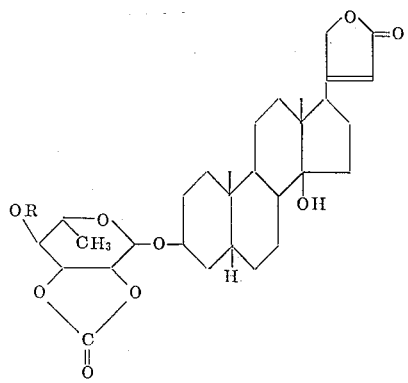

(I)

wherein R is hydrogen or alkanoyl or alkyl having 1 to 5 carbon atoms.

2. A compound as claimed in claim 1, which is digitoxigenine-3-α-[L-rhamnopyranoside-2',3'-cyclocarbonate] (evomonoside-2',3'-cyclocarbonate).

3. A compound as claimed in claim 1, which is evomonoside-2',3'-cyclocarbonate-4'-acetate.

4. A compound as claimed in claim 1, which is evomonoside-2',3'-cyclocarbonate-4'-methyl ether.

5. A compound as claimed in claim 1, which is evomonoside-2',3'-cyclocarbonate-4'-propionate.

* * * * *